(12) United States Patent
Gong et al.

(10) Patent No.: US 6,643,027 B2
(45) Date of Patent: Nov. 4, 2003

(54) OPTICAL MEASUREMENT SYSTEM AND METHOD FOR DETERMINING HEIGHT DIFFERENTIAL BETWEEN TWO SURFACES

(75) Inventors: William Gong, Sunnyvale, CA (US); Richard Tella, Sunnyvale, CA (US); Glenn Rankin, Menlo Park, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 32 days.

(21) Appl. No.: 09/929,767

(22) Filed: Aug. 14, 2001

(65) Prior Publication Data

US 2003/0035117 A1 Feb. 20, 2003

(51) Int. Cl.⁷ .................................................. G01B 9/02
(52) U.S. Cl. ..................................................... 356/516
(58) Field of Search .......................... 356/516, 517, 356/514, 511, 508, 505, 497, 496, 491, 492, 493, 495

(56) References Cited

U.S. PATENT DOCUMENTS 4,298,283 A  * 11/1981  Makosch et al. ........... 356/495
4,358,201 A  * 11/1982  Makosch ..................... 356/495
5,914,782 A  *  6/1999  Sugiyama .................... 356/491

* cited by examiner

Primary Examiner—Frank G. Font
Assistant Examiner—Michael A. Lyons

(57) ABSTRACT

The split-beam optical thickness gauge (OTG) measures the height difference of two adjacent surfaces. Low-coherence light is generated by the low-coherence light source. The split-beam probe head receives the low-coherence light and splits the incoming low-coherence light into a primary beam and walk-off beam. The primary beam shines upon a first surface and is reflected back up into the split-beam probe head. The walk-off beam shines upon a second surface and is reflected back up into the split-beam probe head. Spatial separation between the primary beam and the walk-off beam ensures that each beam shines substantially on only one of the surfaces. An incorporated polarizer assures that the primary and walk-off beams interfere. The reflected light returns to the autocorrelator and is detected so that distance measurements can be determined based upon a change in the path difference between the reflected primary beam and the walk-off beam.

23 Claims, 7 Drawing Sheets

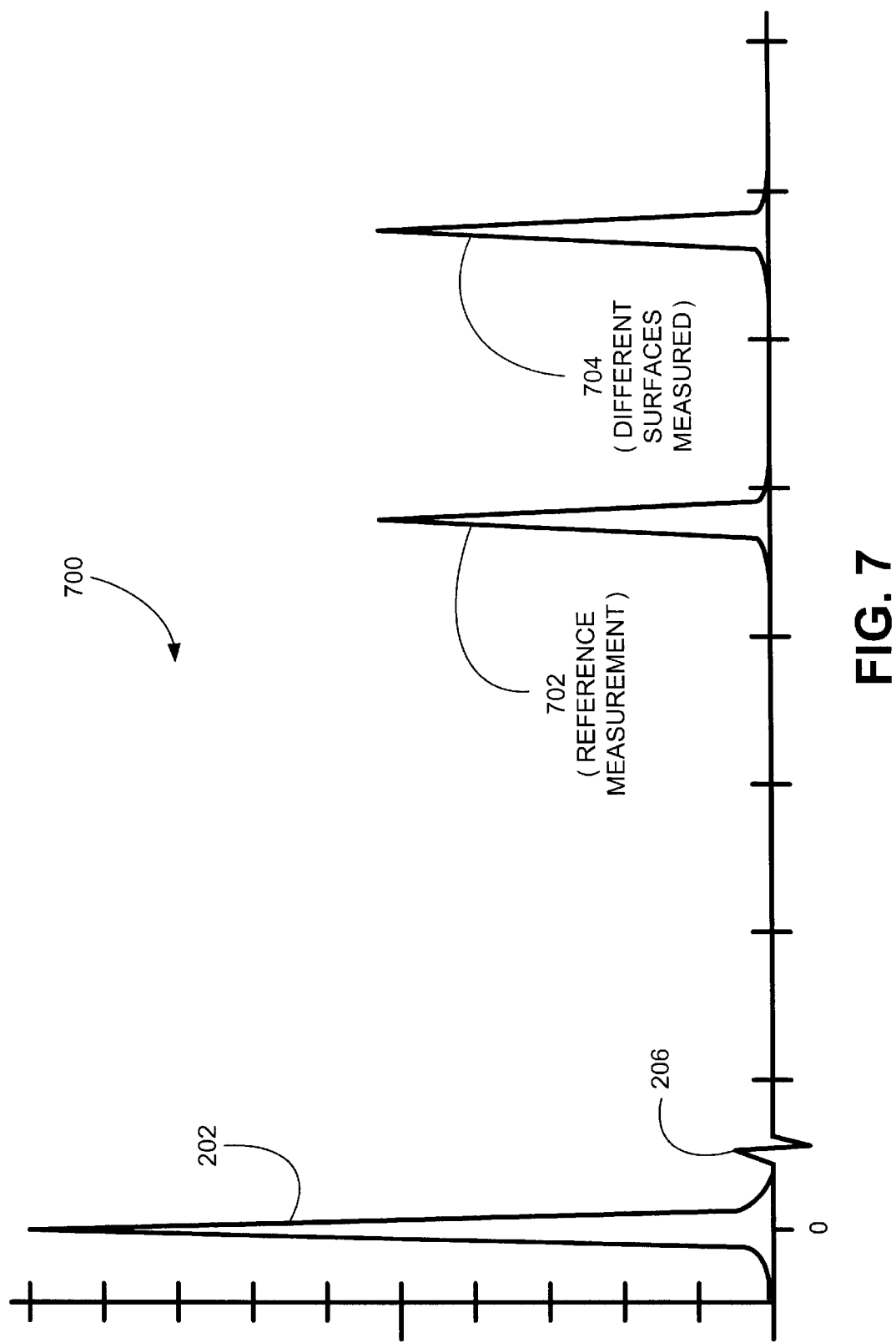

OPTICAL MEASUREMENT SYSTEM AND METHOD FOR DETERMINING HEIGHT DIFFERENTIAL BETWEEN TWO SURFACES

FIELD OF THE INVENTION

The present invention generally relates to optical reflectometry, and more particularly, to a system and method for measuring the height differential between two adjacent surfaces.

BACKGROUND OF THE INVENTION

With the advent of optical reflectometry based measuring devices capable of distances as small as 10 microns ($\mu$m), precise and accurate measurements of critically small distances can be made. A nonlimiting example of an optical reflectometry based measuring device is the optical thickness gauge (OTG) once sold by Hewlett-Packard (HP 86125A-K1X). The operation and functionality of such an OTG is disclosed in U.S. Pat. Ser. No. 5,642,196, filed on Jun. 24, 1997, and entitled METHOD AND APPARATUS FOR MEASURING THE THICKNESS OF A FILM USING LOW COHERENCE REFLECTOMETRY, which is entirely incorporated herein by reference. Other exemplary optical reflectometry based measuring devices and their applications, incorporated herein by reference, are disclosed in U.S. Pat. No. 5,473,432, filed on Dec. 5, 1995, and entitled APPARATUS FOR MEASURING THE THICKNESS OF A MOVING FILM UTILIZING AN ADJUSTABLE NUMERICAL APERTURE LENS, U.S. Pat. No. 5,610,716, filed on Mar. 11, 1997, and entitled METHOD AND APPARATUS FOR MEASURING FILM THICKNESS UTILIZING THE SLOPE OF THE PHASE OF THE FOURIER TRANSFORM OF AN AUTOCORRELATOR SIGNAL, U.S. Pat. No. 5,633,712, filed on May 27, 1997, and entitled METHOD AND APPARATUS FOR DETERMINING THE THICKNESS AND INDEX OF REFRACTION OF A FILM USING LOW COHERENCE REFLECTOMETRY AND A REFERENCE SURFACES, U.S. Pat. No. 5,646,734, filed on Jul. 8, 1997, and entitled METHOD AND APPARATUS FOR INDEPENDENTLY MEASURING THE THICKNESS AND INDEX OF REFRACTION OF FILMS USING LOW COHERENCE REFLECTOMETRY, U.S. Pat. No. 5,642,196, filed on Jun. 24, 1997, and entitled METHOD AND APPARATUS FOR MEASURING THE THICKNESS OF A FILM USING LOW COHERENCE REFLECTOMETRY, U.S. Pat. No. 5,731,876, filed on Mar. 24, 1998, and entitled METHOD AND APPARATUS FOR ON-LINE DETERMINATION OF THE THICKNESS OF A MULTILAYER FILM USING A PARTIALLY REFLECTING ROLLER AND LOW COHERENCE REFLECTOMETRY, and U.S. Pat. No. 5,850,287, filed on Dec. 15, 1998, and entitled ROLLER ASSEMBLY HAVING PRE-ALIGNED FOR ON-LINE THICKNESS MEASUREMENTS.

FIG. 1 is a block diagram illustrating a conventional optical thickness gauge (OTG) 100 measuring distances associated with a multi-layer film 102 and in communication with a personal computer (PC) 104. The OTG 100 has at least a low-coherence light source 106, an optical coupler 108, an autocorrelator 110 and a probe head 112. Low-coherence light 114 is generated by the low-coherence light source 106 and injected into waveguide 116. Waveguide 116 may be any suitable device, such as an optical fiber, that is configured to transfer the low-coherence light 114 to the optical coupler 108. The low-coherence light 114 propagates through the optical coupler 108, through the waveguide 118 and into the probe head 112. Light is reflected back into the probe head 112, in a manner described below, through the waveguide 118, through the optical coupler 108, through the waveguide 120. The return light 122 is detected by the autocorrelator 110 so that distance measurements can be determined, as described below, by software (not shown) residing in PC 104.

For convenience of illustration, the waveguide 116 is illustrated as having a separation distance from the low-coherence light source 106. One skilled in the art will appreciate that the waveguide 116 would be typically coupled directly to the low-coherence light source 106 using well known coupling devices (not shown). Likewise, the waveguide 120 is illustrated as having some amount of separation from the autocorrelator 110. Waveguide 120 is typically coupled directly to the autocorrelator 110. For convenience of illustration, waveguide 118 is illustrated as being directly coupled to the optical coupler 108 and probe head 112. Coupling devices used to couple waveguides 116, 118 and 120 to devices are well known in the art and are not described in detail or illustrated herein. Furthermore, for convenience of illustration, waveguides 116, 118 and 120 are illustrated as a rod-like material intended to represent a flexible optical fiber. However, any suitable waveguide device configured to transmit light between the low-coherence light source 106, the optical coupler 108, the autocorrelator 110 and the probe head 112, may be substituted for the waveguides 116, 118 and/or 120.

The optical autocorrelator 110 is configured to receive the return light 122. Detectors (not shown) residing in the autocorrelator 110 provide information such that the autocorrelator 110 generates correlation peaks that are shown on graph 128. Separation between correlation peaks corresponds to distances between any two light reflecting surfaces.

Optical correlator 110 is coupled to PC 104 via connection 124. Information from autocorrelator 110 is received by the PC 104 and processed by software (not shown) into correlation information. PC 104 typically displays, on display screen 126, the correlation results as a graph 128 having correlation peaks, described in greater detail below. That is, distances between correlation peaks correspond to the measurements taken by the OTG 100.

For convenience of illustration, PC 104 is illustrated as a conventional laptop PC. However, any suitable PC or other processing device may be equally employed to provide the necessary processing of information corresponding to the light signals received by the autocorrelator 110, and to prepare a meaningful output format that may be interpreted by a user of the OTG 100 for the determination of distances. Furthermore, display 126 may be any suitable device for indicating distance information resulting from measurements taken by the OTG 100. For example, but not limited to, display 126 may be a conventional, stand-alone cathode ray tube (CRT). Or, a line printer, plotter, or other hard copy device may be configured to accept and indicate correlation information from the autocorrelator 110.

Light (not shown), entering the probe head 112 via waveguide 118, first passes through a reference surface 130. Here, reference surface 130 is illustrated as the bottom surface of a wedge-shaped plate 131. (For convenience of illustration, wedge-shaped plate 131 is shown from an edge-on viewpoint.) Reference surface 130 is configured to allow a portion of the received light to pass through the wedge-shaped plate 131 and onto film 102. A portion of the received light (not shown) entering the wedge-shaped plate 131 is reflected from reference surface 130, back through the probe head 112, through the waveguide 118, through the optical coupler 108 and then through the waveguide 120 to be received by the autocorrelator 110.

FIG. 2 is a simplified graph 200 illustrating the correlation peaks associated with the reflection of light from the reference surface 130 and the surfaces 132, 134, 136 and 138 of film 102 (FIG. 1). For convenience of illustrating the autocorrelation information on graph 200, the vertical axis corresponding to the magnitude of the correlation peaks is not numbered. One skilled in the art will realize that any appropriate vertical axis numbering system corresponding to the amplitude of the correlation peaks could have been employed, and that such a numbering system is not necessary to explain the nature of the correlation peaks. Similarly, the horizontal axis corresponding to distance has not been numbered on graph 200. One skilled in the art will realize that any appropriate axis number system corresponding to distance could have been employed, and that such a numbering system is not necessary to explain the nature of the relationship between the correlation peaks illustrated in graph 200. Thus, one embodiment of the software generating the graph 200 is configured to allow the user of PC 104 (FIG. 1) to alter the horizontal and the vertical axis numbering systems so that the location of the correlation peaks of interest, and their relative separation corresponding to distance, can be meaningfully discerned and determined by the user of the PC 104.

Information received from the autocorrelator 110 is processed by PC 104 (FIG. 1) such that the correlation peak 202 is plotted at the reference point (x=0 on the x-axis) on graph 200. Correlation peak 202 is a large peak, plotted at the zero or reference point on the x-axis of graph 200, that corresponds to the correlation of each the reflected light portions with itself.

Returning to FIG. 1, the portion of light passing through the reference surface 130, referred to as the incident beam 140, passes through air for a suitable distance before striking the first surface 132 of film 102. When the incident beam 140 shines upon surface 132, a portion of the incident beam 140 is reflected from the surface 132, as reflected light beam 142, back up through the probe head 112, through the waveguide 118, through the optical coupler 108, through the waveguide 120, and then is received by the autocorrelator 110. The autocorrelator 110, based upon the time delay between the light reflected from the reference surface 130 and the reflected light beam 142, determines a correlation peak 204 (FIG. 2) as illustrated on graph 200. Typically, the magnitude of the reflected light beam 142 is relatively small such that the correlation peak 204 is significantly less in magnitude than the correlation peak 202, as illustrated in graph 200. The user of PC 104 viewing graph 200 may interpret the relative separation between correlation peaks 202 and 204 as corresponding to a distance 144 between the reference surface 130 and the surface 132 of film 102.

For convenience of illustration, the incident beam 140 and the reflected light beams 142, 154, 158 and 162 are shown at slight angles. However, one skilled in the art will appreciate that the incident beam 140 and light beams 142, 154, 158 and 162 are all orthogonal to the reference surface 130 and the surfaces 132, 134, 136 and 138. Furthermore, for convenience of illustration, because the distance 144 is typically much greater than the distances of interest associated with film 102, only a portion of the distance between the correlation peaks 202 and 204 is illustrated. Thus, a portion of the horizontal axis and a portion of the distance between correlation peaks 202 and 204 is omitted from graph 200, as indicated by the break line 206.

One skilled in the art will appreciate that the separation between the correlation peaks 202 and 204 is a function of a variety of well known physical factors. Light travels at a finite speed. The speed of the light is affected by the medium through which the light is traveling. Thus, one skilled in the art will readily appreciate that two significant factors in determining the time delay of the various portions of light detected by the autocorrelator 110 are the total distance traveled by the light, and the properties of the various medium through which the light travels. For example, the reflected light beam 142 travels from the reference surface 130 to surface 132, and then returns back to the reference surface 130. Therefore, because reflected light beam 142 travels farther than the light reflecting from the reference surface 130, and because the light beam 142 travels through air, the light beam 142 requires more time to reach the autocorrelator 110 than the time required by the light reflecting from the reference surface 130. The physical properties associated with the mediums through which the light travels is defined by the well known refractive index (n) of the material. Thus, software analyzing the relative separation between correlation peak 202 and correlation peak 204 accurately calculates the distance 144 and provides that information to the user of PC 104. This information may be communicated by appropriately labeling the horizontal axis of FIG. 2, and/or providing a numerical figure to the user. Such a process of determining distances with an OTG 100 (FIG. 1) is well known in the art and is not described in further detail herein.

FIG. 1 illustrates the OTG 100 measuring distances associated with film 102. For convenience of illustration, film 102 has three layers; a top layer 146, a middle layer 148 and a bottom layer 150. The layers 146, 148 and 150 are made from different materials bonded together to create a single layer of film 102. Typically, film 102 is a long, continuous roll or sheet of flexible material. However, for convenience, only a portion of the roll or sheet of film 102 is shown in FIG. 1, as illustrated by the cut-away lines 152. Furthermore, the layers 146, 148 and 150 must be sufficiently transparent such that incidence beam 140 travels through, and light is reflected back through the layers 146, 148 and 150.

Each layer 146, 148 and 150 have different refractive indices (n). Surface 132 corresponds to the transition between air and the film 102, and thus corresponds to a change in the refractive index of air to the refractive index of the top layer 146. Similarly, surface 134 corresponds to the transition between the material of top layer 146 and the material of middle layer 148. Surface 136 corresponds to the transition between the middle layer 148 and the bottom layer 150. Surface 138 corresponds to the bottom surface of film 102, and also corresponds to a transition between the bottom layer 150 and the material that the film 102 is residing in, such as air. Each of these surfaces may also be characterized by a change in refractive indices.

When incidence beam 140 is incident on surface 134, a portion of the incidence beam 140 passes through the surface and a portion of the incidence beam 140 is reflected back up to the probe head 112 because of the difference in the refractive indices n of the layers 146 and 148. The amount of reflected light corresponds, in part, to the degree of difference between the refractive indices n. Thus, when incidence beam 140 passes through top layer 146 into the middle layer 148, reflected light beam 154 is reflected from the surface 134 back up through the top layer 146 and into probe head 112. The reflected light beam 154 is eventually detected by the autocorrelator 110 in the manner described above. Because of the time delay between the reflected light beam 154 from the surface 134 with respect to the light reflected from reference surface 130, a correlation peak 208 (FIG. 2) will be determined. Furthermore, since the time delay between the reflective light beam 154 from the surface 134, with respect to the reflective light being 142 from the surface 132, is equal to the time required for the light to travel through the layer 146 only, the separation between the correlation peak 204 and correlation peak 208 (FIG. 2) is proportional to the distance 156 and the index of refraction of the layer 146.

Similarly, a portion of incidence beam 140 incident on the surface 136, corresponding to the material transition between the middle layer 148 and the bottom layer 150, is reflected back up to the probe head 112 as reflected light beam 158. Because of the time delay associated with the reflected light beam 158 with respect to the light reflected from reference surface 130, a correlation peak 210 (FIG. 2) is determined. Furthermore, since the time delay between the reflective light being 158 from the surface 136, with respect to the reflective light being 154 from the surface 134, is equal to the time required for light to travel through the layer 148 only, the separation between the correlation peak 208 and the correlation peak 210 is proportional to the distance 160 and the index of refraction of the layer 148.

Likewise, a portion of incidence beam 140 will be reflected from surface 138 back up to the probe head 112 as reflected light beam 162. Because of the time delay associated with the reflected light beam 162 with respect to the light reflected from reference surface 130, a correlation peak 212 (FIG. 2) is determined. Furthermore, since the time delay between the reflective light beam 162 from the surface 138, with respect to the reflective light being 158 from the surface 136, is equal to the time required for light to travel through layer 150 only, the separation between the correlation peak 210 and the correlation peak 212 is proportional to the distance 164 and the index of refraction of the layer 150. In some applications, the bottom surface 138 of the film 102 is coated with a highly reflective surface such that a large portion of the incidence beam 140, or all of the remaining incidence beam 140, is reflected up to the probe head 112 as reflected light beam 162. Thus, the correlation peak 212 is illustrated as having a relatively greater magnitude than the correlation peaks 204, 208 and 210 (FIG. 2).

For convenience of illustrating graph 200 (FIG. 2), not all correlation peaks are illustrated. Autocorrelator 110 (FIG. 1) generates a correlation peak for all pairs of reflections from any two surfaces. For example, the autocorrelator 110 determines a correlation peak associated with the reflected light beam 154 and the reflected light beam 158 (FIG. 1). Another example includes a correlation peak associated with the reflected light beam 154 and the reflected light beam 162 (FIG. 1). One skilled in the art will appreciate that many correlation peaks (not shown for convenience of illustration) will be displayed on graph 200, and that one skilled in the art will employ experience in using the OTG 100 (FIG. 1) to determine which correlation peaks are relevant to the particular measurements of interest. Thus, for convenience of illustration, the correlation peaks illustrated on graph 200 are limited to peaks that are convenient in explaining the operation and functionality of the OTG 100.

Summarizing, the OTG 100 shines a low-coherence incidence beam 140 onto the film 102 such that portions of the incidence beam 140 are reflected back to the OTG (reflected light beam 142, 154, 158 and 162) and detected by the autocorrelator 110. Software analyzes the time delays associated with the reflected light beam 142, 154, 158 and 162, with respect to the light reflected from reference surface 130, to determine the distances 144, 156, 160 and 164, respectively. The ability to resolve the minimum peak separation is determined by the coherence-length of the light source. Thus, a lower coherence length light source gives a higher resolution. One commercially available OTG is capable of discerning distances as small as 10 $\mu$m.

However, such an OTG 100 is not capable of measuring with any degree of reliability and accuracy other types of material configurations. One such material configuration is illustrated in FIG. 3. FIG. 3 is a block diagram illustrating the OTG 100 attempting to measure distances associated with the top surface 302 of material 304 and the top surface 306 of material 308. For convenience of illustration, only the ends of materials 304 and 308 are shown, as indicated by the cut-away lines 310 and 312, respectively.

Materials 304 and 308 are aligned adjacent to each other. Here, it is desirable to measure the relative vertical positioning of the top surfaces 302 and 306 with respect to each other. Proper vertical positioning of the materials 304 and 308 with respect to each other may be of interest, particularly where the positioning of the materials 304 and 308 must be within a predefined tolerance with respect to each other to ensure proper functionality of materials 304 and 308 in a system (not shown). For convenience of illustration, an end surface 314 of material 304 and an end surface 316 of material 308 are illustrated as being in close proximity to each other, but not touching. Here, it may be desirable to precisely measure the relative positioning of the materials 304 and 308 with respect to each other by measuring the position of surfaces 302 and 306. If the alignment of material 304 and 308 is within a predefined tolerance, it may be desirable to then join end surfaces 314 and 316, by welding or by application of a suitable adhesive, such that the materials 304 and 308 are joined together in a precise manner.

OTG 100, as will be appreciated by one skilled in the art, is not well suited for making the precise measurements necessary to accurately determine the relative positioning of surface 302 with respect to surface 306. That is, reflected light from the surfaces 302 and 306 may not provide for the determination of suitable correlation peaks such that the relative positioning of surfaces 302 and 306 can be determined.

Here, light 318 from the probe head 112 is shined onto materials 304 and 308. Light 318 is intended to correspond to incidence beam 140 (FIG. 1). However, for convenience of illustration, light 318 is illustrated as a beam of light (by the plurality of arrows) emanating from probe head 112. The beam of light 314 has a predefined cross-sectional area, known as the spot size. Spot size is determined by the optics (not shown) designed into the probe head 112. In some applications, a large spot size is undesirable in that a more precise angular positioning of the probe head 112 over the material(s) being measured is required, thus making the OTG 100 more difficult to properly align over the material.

Light 318 results in light reflected from the materials 304 and 308 back up into the probe head 112 in a manner described above. Reflected light 322 is reflected from surface 302 of material 304 up to probe head 112. Similarly, reflected light 324 is reflected from the top surface 306 of material 308 up to probe head 112. Reflected light 322 and 324 are desirable light reflections in that correlation of the reflected light 322 and 324 with respect to the light reflected from reference surface 130 provides the time delay information to determine the distances 326 and 328, respectively. For the reliable and accurate determination of distances 326 and 328, the reflected light 322 and 324, respectively, must have a sufficient magnitude to generate meaningful correlation peaks that can be discerned from the correlation peaks caused by other reflected light.

Material 308 is illustrated as having a rounded corner surface 330 which joins top surface 306 with end surface 316. Corner surface 330 may cause reflected light 334 to be reflected away from the probe head 112 such that the total amount of reflected light returning to probe head 112 is decreased. In practical applications where two materials are to be joined, surface imperfections such as chips, scratches or other deformations are frequently encountered. Such imperfections may have as similar undesirable effect on the reflection of light up to the probe head 112 as described above for the corner surface 330.

Furthermore, any spatial separation between the end surface 314 and the end surface 316 will result in portions of light 318 to pass through the spatial separation, thereby decreasing light reflection back up to probe head 112. This light 336 passing through the spatial separation effectively reduces the total amount of reflected light in an undesirable manner. Furthermore, the spot size 320 may be so narrow that a majority of the light 318 passes through the spatial separation between end surfaces 314 and 316 such that insufficient reflected light is available for determining correlation peaks associated with the surfaces 302 and 306. In such a situation, the spot size 320 could be increased, through suitable optics design, to increase the coverage area of the beam of light 318 onto both surfaces 302 and 306. However, as one skilled in the art will appreciate, an increased spot size 320 necessarily increases the requirement for angular alignment between the axis of the measurement beam and the measured surfaces. Such a requirement of a more precise angular alignment is undesirable since reliable and accurate operation the OTG 100 becomes more difficult.

Thus, a heretofore unaddressed need exists in the industry for providing a system and method of accurately and reliably measuring surface height differentials with optical reflectometry based measuring devices, such as a conventional OTG.

SUMMARY OF THE INVENTION

The present invention overcomes the inadequacies and deficiencies of the prior art as discussed hereinabove. The present invention, a split-beam optical thickness gauge (OTG), provides a system and method for measuring the difference in heights of two adjacent surfaces. The split-beam OTG has at least a low-coherence light source, an optical coupler, an autocorrelator and a split-beam probe head. Low-coherence light is generated by the low-coherence light source and injected into a waveguide for transmission to the optical coupler. The split-beam probe head receives the low-coherence light, from the optical coupler via another waveguide, and splits the incoming low-coherence light into a primary beam and walk-off beam.

Two materials are positioned adjacent to each other. The primary beam shines upon the top surface of the first material. Light from the primary beam is reflected back up into the split-beam probe head. The walk-off beam shines upon the top surface of the second material. Light from the walk-off beam is reflected back up into the split-beam probe head. Spatial separation between the primary beam and the walk-off beam ensures that each beam shines substantially on only one of the surfaces. The reflected light returns to the autocorrelator and is detected so that distance measurements can be determined based upon the time delay of the walk-off beam with respect to the primary beam.

In one embodiment, the autocorrelator determines correlation peaks that are plotted on a graph. The difference between the position of the correlation peaks corresponds to the height difference between the two surfaces. The graph is displayed on display residing on a personal computer, such as a laptop.

The present invention can also be viewed as providing a method for measuring heights of two adjacent surfaces. The method includes the steps of splitting a beam of energy into a primary beam and a walk-off beam; transmitting the primary beam onto a first surface and the walk-off beam onto a second surface; detecting reflections of the primary beam from the first surface and the walk-off beam from the second surface; and determining a distance between the first surface and the second surface based upon an optical path length difference between the detected reflections of the primary beam and the walk-off beam.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

FIG. 7 is a simplified graph illustrating the correlation peaks associated with the reflection of light from measurements of the two surfaces as illustrated in accordance with FIGS. 5 and 6.

DETAILED DESCRIPTION a. Overview of the Optical Measurement System

Figure 4:
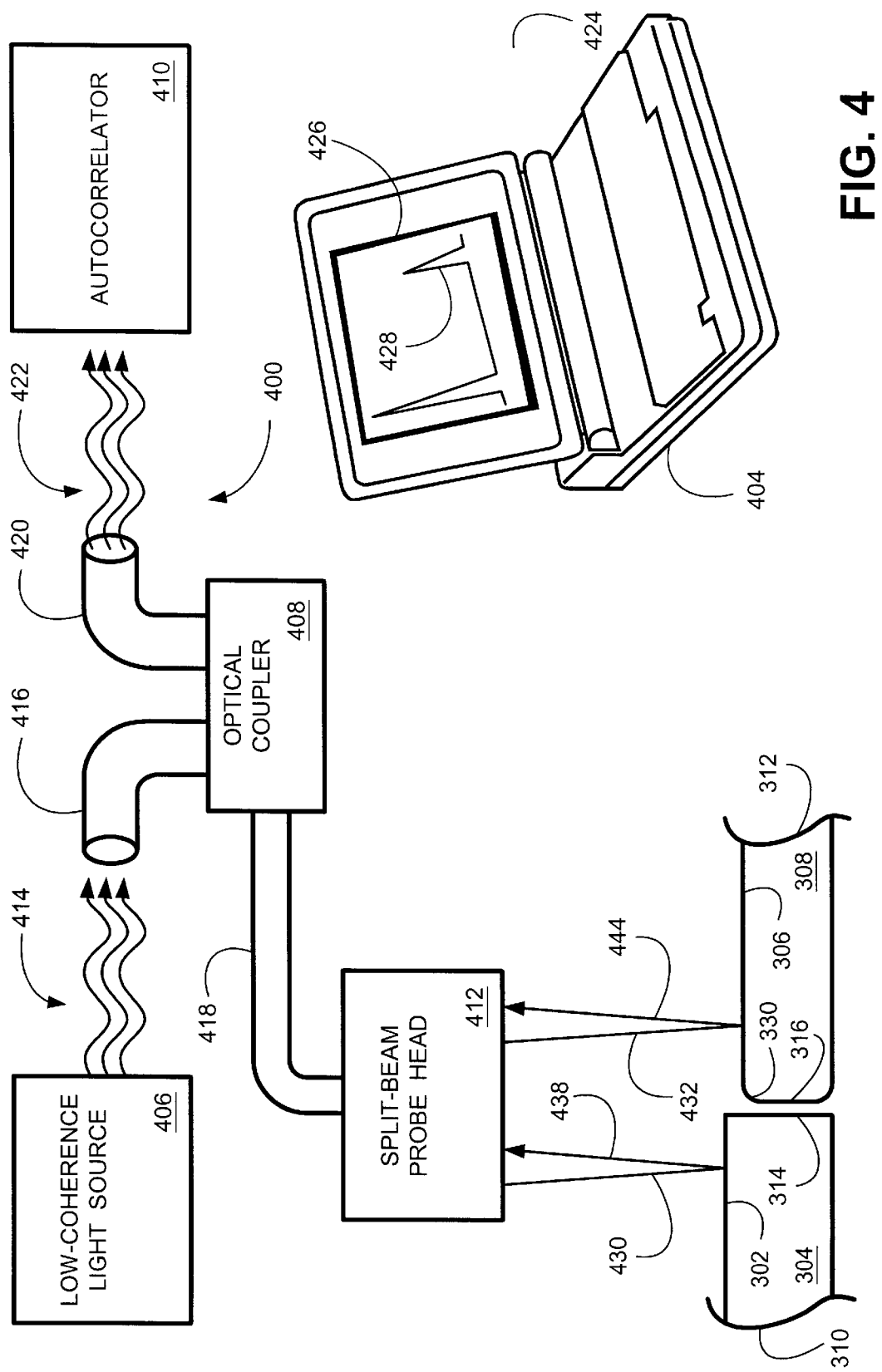
FIG. 4 is a block diagram illustrating a split-beam OTG configured to measure the surface heights of two adjacent surfaces.

FIG. 4 is a block diagram illustrating an embodiment of, in accordance with the present invention, a split-beam optical thickness gauge (OTG) 400, configured to measure the surface heights of two adjacent surfaces. The split-beam OTG 400 has at least a low-coherence light source 406 (referred to herein as a wave generator that generates a wave), an optical coupler 408, an autocorrelator 410 and a split-beam probe head 412.

Low-coherence light 414 is generated by the low-coherence light source 406 and injected into the waveguide 416. The split-beam probe head 412 is configured to receive light from the low-coherence light source 406, via waveguide 416, optical coupler 408 and waveguide 418. This incoming light is split into two incident beams 430 and 432.

Primary beam 430 is incident upon the top surface 304. A reflected light beam 438 is reflected back up into the split-beam probe head 412. Walk-off beam 432 is incident upon the top surface 306 of the material 308. A reflected light beam 444 is reflected back up into the split-beam probe head 412. The reflected light returns to the autocorrelator 410 via waveguide 418, optical coupler 408 and waveguide 420. The return light 422 is detected by the autocorrelator 410 so that distance measurements can be determined, as described below, by software (not shown) residing in the personal computer (PC) 404. For convenience of illustration, PC 404 is shown as a laptop type PC.

In one embodiment, the autocorrelator 410 determines correlation peaks associated with the reflected light beams 438 and 444. Correlation peaks are shown on the graph 428. The graph 428 is displayed on display 426 residing on PC 404. Thus, the height difference between surface 302 and surface 306 is determined by a person using the OTG 400.

By controlling the spatial separation of the incident beams 430 and 432, the incident beams 430 and 432 are separately incident on the top surfaces 302 and 306, respectively. Furthermore, spatial separation of the incident beams 430 and 432 is specified such that substantially no light passes through the spatial separation between the edge 314 of material 304 and the edge 316 of material 308, thus overcoming one of the deficiencies in the prior art OTG 100. Furthermore, substantially no portion of either incident beam 430 or 432 is shining upon the rounded corner surface 330 of material 308. Thus, there are substantially no interfering and/or undesirable reflections of light, or a loss of reflected light, from the rounded corner surface 330.

Figure 1:
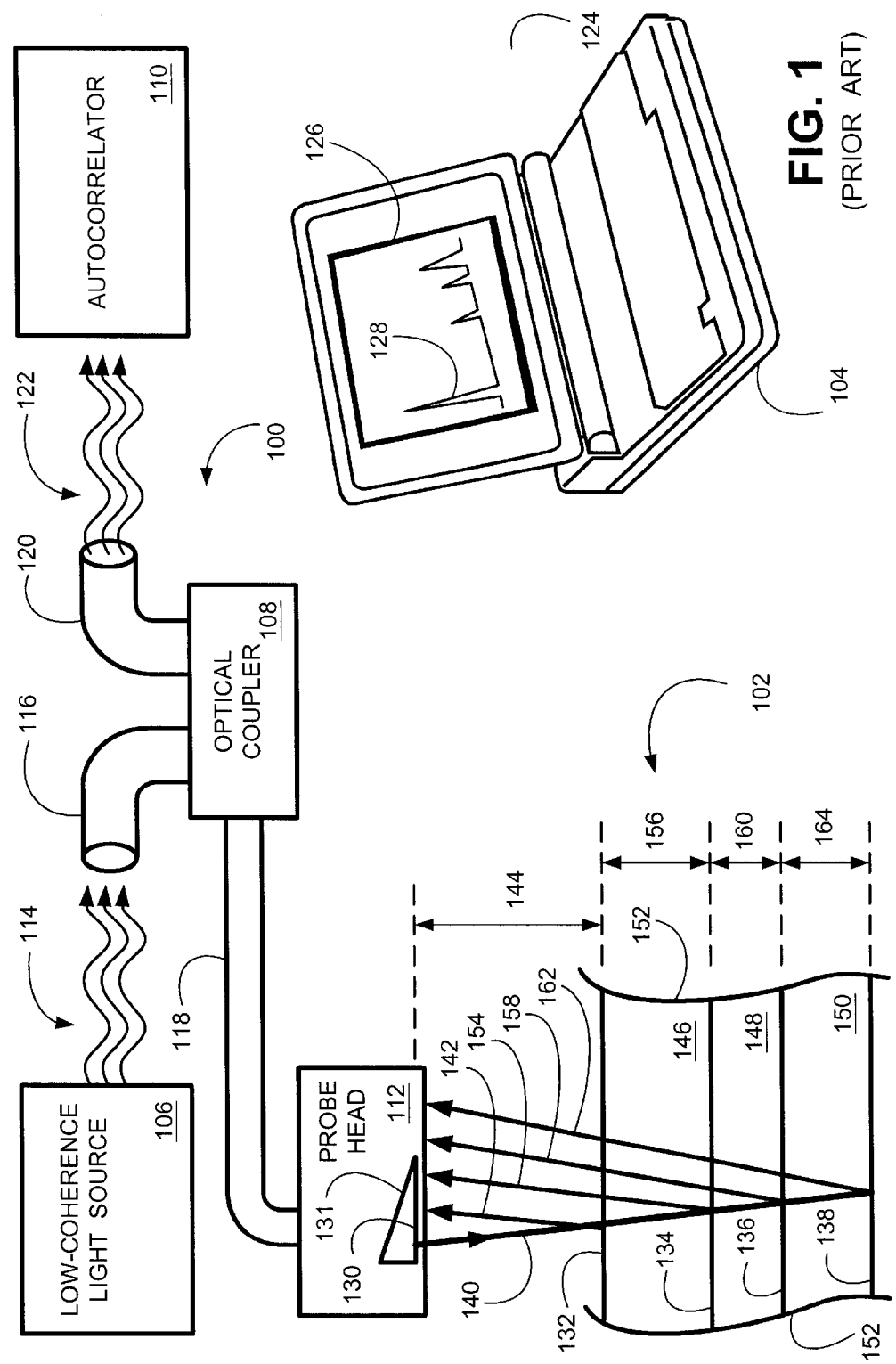
FIG. 1 is a block diagram illustrating a conventional optical thickness gauge (OTG) measuring distances associated with a film and in communication with a personal computer (PC).
Figure 2:
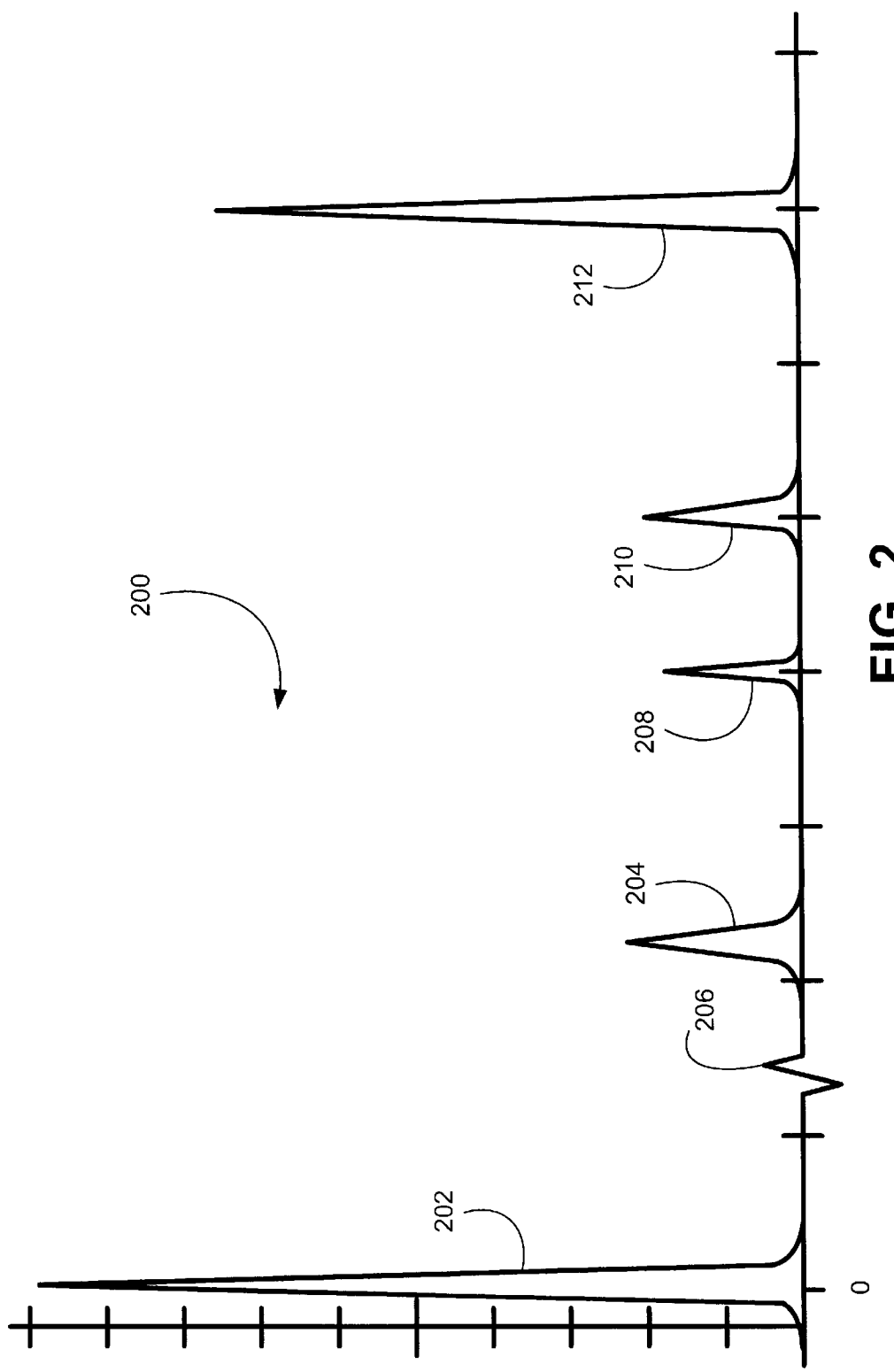
FIG. 2 is a simplified graph illustrating the correlation peaks associated with the reflection of light from the reference surface and the surfaces of the film layers of FIG. 1.
Figure 3:
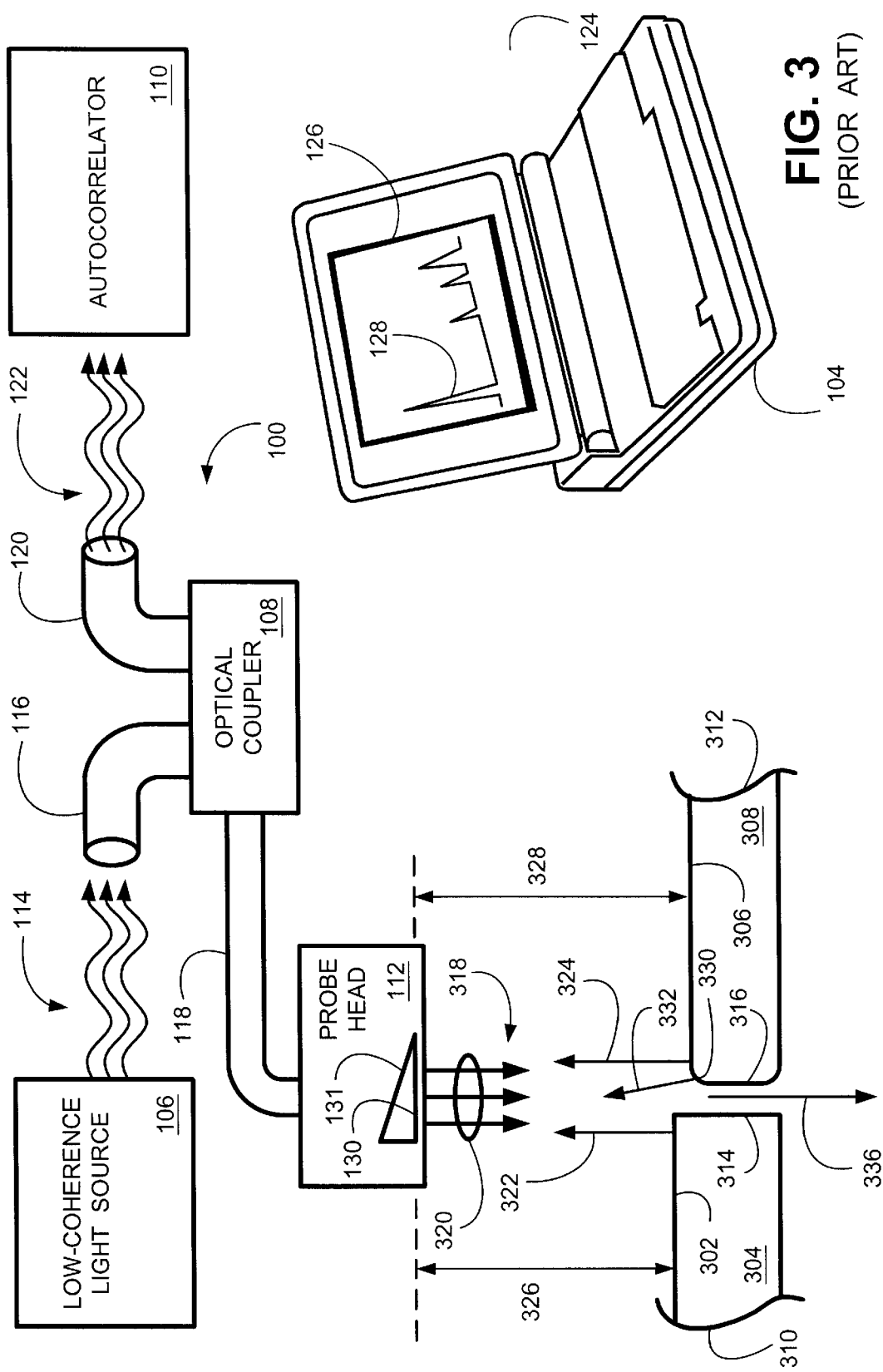
FIG. 3 is a block diagram illustrating the OTG of FIG. 1 attempting to measure distances associated with the top surfaces of two adjacent materials.

Many of the components employed in the OTG 400 are similar to, or even identical to, the components residing in the prior art OTG 100. Those components residing in OTG 400 that are similar to, identical to, or have the same functionality as components residing in OTG 100 are not described again in detail herein, other than to the extent necessary to explain the operation and functionality of the invention, the split-beam OTG 400, as described below. For example, the waveguides 416, 418 and 420 may be any suitable device, such as an optical fiber, configured to transfer low-coherence light. Furthermore, for convenience, the components of the OTG 100 illustrated in FIG. 1 and the OTG 400 illustrated in FIG. 4 having similar operation and functionality, bear similar reference numerals in that elements in FIG. 1 are labeled 1xx and similar elements in FIG. 4 are labeled 4xx. (For example, see the optical coupler 108 of FIG. 1 and optical coupler 408 of FIG. 4.) Furthermore, for convenience of illustrating light reflected from the surfaces 302 and 306, the incident beams 430 and 432, and the reflected light beams 438 and 444, are shown at slight angles. However, one skilled in the art will appreciate that the incident beams 430 and 432, and the reflected light beams 438 and 444, are all orthogonal to the surfaces 302 and 306.

b. Reference Measurement with a Split-Beam Probe Head

Figure 5:
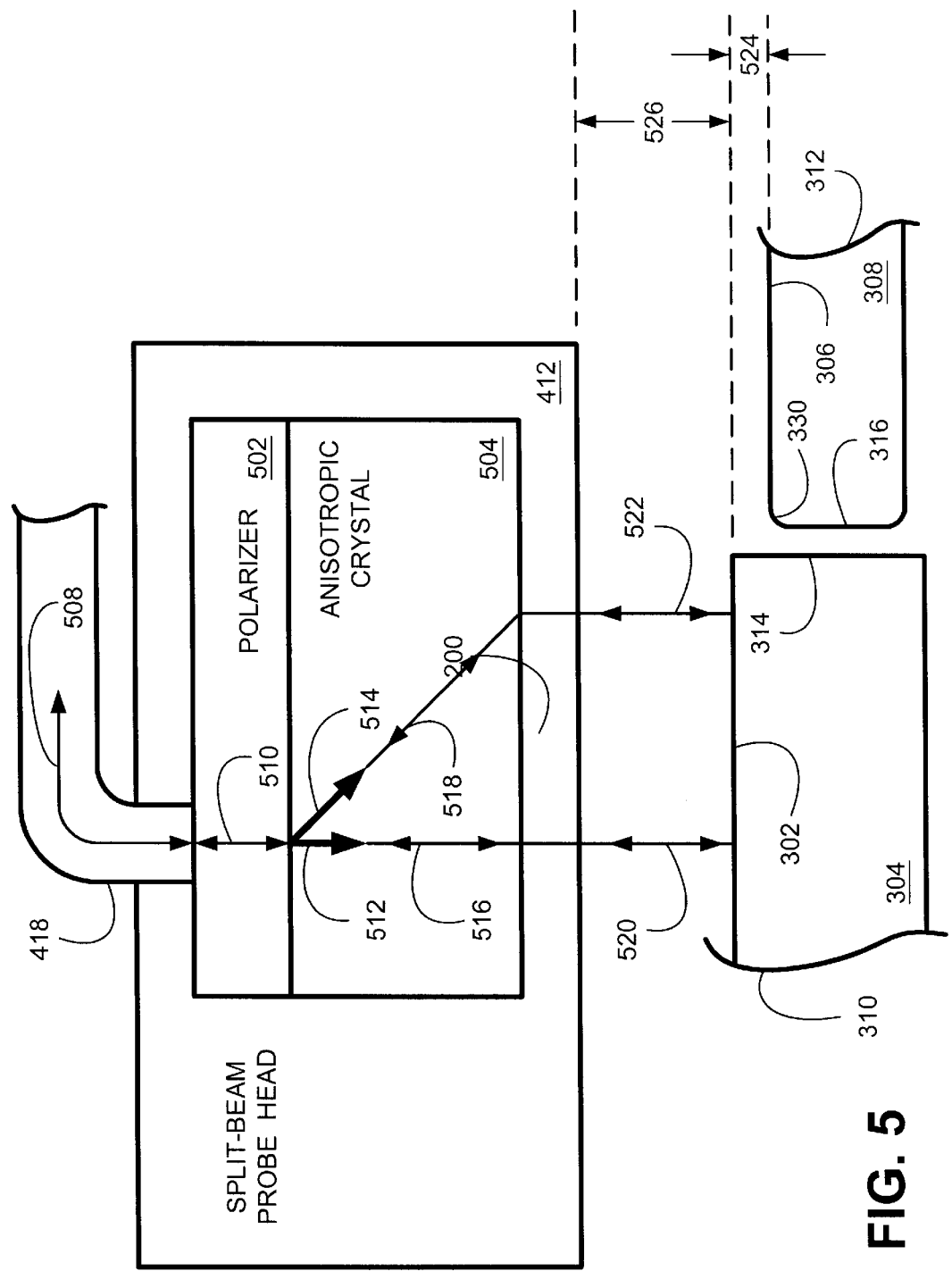
FIG. 5 is a block diagram illustrating in greater detail the polarizer and the anisotropic crystal implemented in the split-beam probe head of the split-beam OTG of FIG. 4 making a reference measurement on a first surface.

FIG. 5 is a block diagram illustrating in greater detail split-beam probe head 412. Split-beam head probe 412 includes at least a polarizer 502 and an anisotropic crystal 504. OTG 400 is measuring a reference height for a first surface 302. When a measurement is taken in accordance with FIG. 5, a reference correlation peak 702 (FIG. 7) is determined by the autocorrelator 410 (FIG. 4).

Light travelling along path 508 in the waveguide 418 enters the polarizer 502. Polarizer 502 transmits light, along path 510, through the polarizer 502. The light then enters the anisotropic crystal 504 causing it to split into two incident beams, a primary beam 512 and a walk-off beam 514. The primary beam 512 travels through the anisotropic crystal 504 along path 516. The walk-off beam 514 travels through the anisotropic crystal 504 along path 518. The primary beam 512 and the walk-off beam 514 exit the anisotropic crystal 504 along paths 520 and 522, respectively. Here, both the primary beam 512 travelling along the path 520 and the walk-off beam 514 travelling along the path 522 are reflected from the surface 302 back up into the split-beam probe head 412. The reflected primary beam 512 and the reflected walk-off beam 514, returning along the paths 520 and 522, respectively, then travel back through the anisotropic crystal 504 along the paths 516 and 518, respectively.

Reflective light returning along the paths 516 and 518 to the anisotropic crystal 504 pass through polarizer 502 along path 510. Polarizer 502 projects the polarizations of the reflected primary and reflected walk-off beams onto a single direction so that they exhibit the desired interference.

Summarizing, the primary beam 512 travels through the anisotropic crystal 504 (along path 516), down to the surface 302 (along path 520), and is reflected back up through the anisotropic crystal 504 (along paths 520 and 516). Similarly, the walk-off beam 514 travels throughout the anisotropic crystal 504 (along path 518), down to the surface 302 (along path 522), and is reflected back up through the anisotropic crystal 504 (along paths 522 and 518).

However, because the optical path 518 is different from optical path 516, the walk-off beam 514 travels a different distance than the primary beam 512. Since path 520 and 522 have the same length, the different distance that the walk-off beam 514 travels, when compared to the primary beam 512, equals two times the difference of the optical length of paths 516 and 518. One skilled in the art will appreciate that the spatial separation of the two paths 520 and 522, and the optical path length difference of paths 516 and 518, are determined by the thickness of the anisotropic crystal 504, the angle of the walk-off beam 514, and the refractive indices experienced by the primary and walk-off beams. The angle that the walk-off beam 514 travels through the anisotropic crystal 504 is determined by the material characteristics of the anisotropic crystal 504 and the orientation of its optical axis relative to its cut surfaces.

Because the walk-off beam 514 travels a different optical path length than the primary beam 512, a time delay results. The autocorrelator 410 (FIG. 4) detects this time delay between the primary beam 512 and the walk-off beam 514, and a reference correlation peak 702 is determined. The location of correlation peak 702 (FIG. 7) along the x axis is at the optical path length difference between the primary beam 512 and the walk-off beam 514. Since the autocorrelator 410 determines the path length difference between the primary beam 512 and the walk-off beam 514 with both beams reflecting off surface 302, the thickness of the anisotropical crystal 504 does not have to be precisely fabricated or precisely known. Nor do the material characteristics of the anisotropic crystal 504, such as the walk-off beam angle or the index of refraction, have to be precisely known.

The anisotropic crystal 504 may be conveniently selected from a plurality of standardized crystals to economically facilitate manufacturing and assembly. Or, anisotropic crystal 504 may be a specially fabricated crystal. Furthermore, one skilled in the art will appreciate that the dimensional specifications for the anisotropic crystal 504 are easily determined using well known geometrical equations and well known properties of anisotropic crystals. Thus, specific dimensional specifications of the anisotropic crystal 504, or a description of the fabrication process for forming the anisotropic crystal 504, are not provided herein. Any suitable anisotropic crystal 504 configured to have the above-described functionality is intended to be included herein within the scope of this disclosure and be protected by the accompanying claims for the split-beam OTG 400.

FIG. 7 is a simplified graph 700 illustrating the reference measurement correlation peak 702 determined from the time delay associated of the walk-off beam 514 with respect to the primary beam 512 resulting from measurements of the surface 302 (FIG. 5). One skilled in the art will appreciate that since the primary beam 512 (FIG. 5) and the walk-off beam 514 (FIG. 5) are traveling through various materials each having known refractive indices (n), the travel times associated with the primary beam 512 and/or the walk-off beam 514 can be accurately associated with an optical distance, which is the summation of the thickness of each different material multiplied by the index of refraction (n) of that material, for the polarization of interest. The time delay difference between the primary beam 512 and the walk-off beam 514 is due to the different optical distance traveled by the walk-off beam 514. The difference in the distance traveled by the walk-off beam 514 relative to the distance traveled by the primary 512 is hereinafter referred to as the "optical path length difference between the two beams." Therefore, the position of the reference measurement correlation peak 702 corresponds to the optical path length difference between the two beams.

Both the primary beam 512 and the walk-off beam 514 are reflected from the same surface 302. Therefore, when a reference measurement is taken in accordance with FIG. 5, a reference measurement correlation peak 702 (FIG. 7) is determined. Accordingly, the distance 524 has not yet been measured since no incident beams are incident on the surface 306 of the material 308. The position of the reference measurement correlation peak 702 is used to determine an associated change in the distance that the walk-off beam 604 (FIG. 6) travels when surfaces 302 and 306 are measured, as described below in accordance with FIG. 6.

Furthermore, the distance 526 (FIG. 5) of the split-beam probe head 412 from the surface 302 (FIG. 5) is not relevant to the position of correlation peak 702 (FIG. 7). The position of reference measurement correlation peak 702 corresponds to the optical path length difference between the two beams. Therefore, when the distance 526 is varied, the optical path length difference between the two beams does not change because the optical path lengths of both beams increase or decrease by the same amount. Thus, the position of the reference measurement correlation peak 702 is independent of the distance 526.

For convenience of illustrating FIG. 7, the vertical axis corresponding to the magnitude of the correlation peaks is not numbered. One skilled in the art will realize that any appropriate vertical axis numbering system corresponding to the amplitude of the correlation peaks could have been employed, and that such a numbering system is not necessary to explain the nature of the correlation peaks. Similarly, the horizontal axis corresponding to distance has not been numbered on graph 700. One skilled in the art will realize that any appropriate axis number system corresponding to distance could have been employed, and that such a numbering system is not necessary to explain the nature of the relationship between the correlation peaks illustrated in graph 700. Thus, one embodiment of the software generating the graph 700 is configured to allow the user of PC 104 (FIG. 1) to alter the horizontal and the vertical axis numbering systems so that the location of the correlation peaks of interest, and their relative separation corresponding to distance, can be meaningfully discerned and determined by the user of PC 404. In another embodiment, logic residing in PC 404 is configured to display the x-axis of graph 700 in units that correspond to measurements of distance.

c. Distance Measurement with a Split-Beam Probe Head

Figure 6:
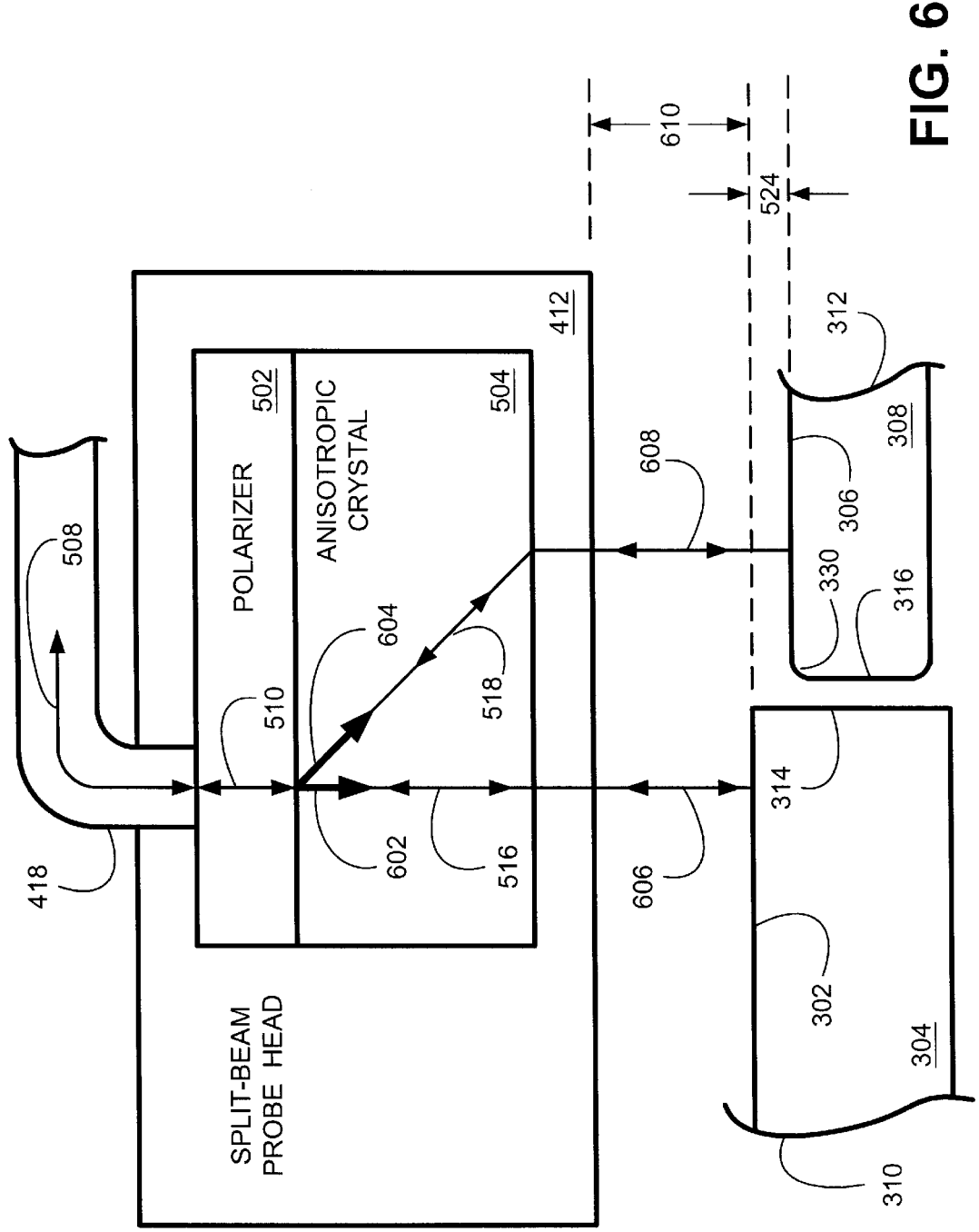
FIG. 6 is a block diagram illustrating in greater detail the polarizer and the anisotropic crystal implemented in the split-beam probe head of the split-beam OTG of FIG. 4 measuring heights of two surfaces.

Once the reference measurement has been taken in accordance with FIG. 5 as described above, the split-beam probe head 412 is repositioned such that the primary beam 602 and the walk-off beam 604 are incident upon surfaces 302 and 306, respectively. This measurement scenario is illustrated in FIG. 6. The primary beam 602 (travelling along paths 516 and 606) is incident on the surface 302 of the material 304. The walk-off beam 604 (travelling along paths 518 and 608) is incident on surface 306 of material 308.

The paths 516 and 518 are the same in FIGS. 5 and 6 since the dimensions of the anisotropic crystal 504 are constant. However, length of the path 606 may be different from the length of path 520 (FIG. 5) due to the repositioning of the split-beam probe head 412, since maintaining the vertical distance from the split-beam probe head 412 to surface 302 may be difficult. Furthermore, for reasons described below, maintaining the vertical distance from the split-beam probe head 412 to surface 302 is not necessary to accurately measure the distance 524. Also, the length of path 608 is most probably different from the length of path 522 because the surface 306 is now being measured.

When a measurement is taken of the surfaces 302 and 306 in accordance with FIG. 6, the optical path length difference between the primary beam 602 and the walk-off beam 604 changes by an amount corresponding to the distance 524, compared to that shown in FIG. 5. More precisely, the change in the optical path length difference between the two beams 602 and 604 equals two times the difference of the length 524. Thus, when the autocorrelator 410 (FIG. 4) detects the change in the optical path length difference between the two beams 602 and 604, a correlation peak 704 (FIG. 7) is determined.

d. Comparison of Correlation Peaks 702 and 704

FIG. 7 is a simplified graph 700 illustrating the reference measurement correlation peak 702 and the correlation peak 704. The reference measurement correlation peak 702 is determined from the time delay difference between the primary beam 512 and the walk-off beam 514 (FIG. 5) resulting from the optical path length difference between the two beams when the surface 302 (FIGS. 4–6) is measured in accordance with FIG. 5. Correlation peak 704 is determined from the optical path length difference between the primary beam 602 and the walk-off beam 604 (FIG. 6) resulting from the measurement of the surfaces 302 and 306 (FIGS. 4–6) taken in accordance with FIG. 6.

When compared to the distance traveled by the walk-off beam 514 (relative to the primary beam 512, FIG. 5), the distance traveled by the walk-off beam 604 (relative to the distance traveled by the primary beam 602, FIG. 6) increases by two times the difference between the length of path 608 and the length of path 606 (FIG. 6). Because of the change in the optical path length difference between the two beams, the position of the correlation peaks 702 and 704 are different. Thus, the magnitude of the change of position of the correlation peaks 702 and 704 corresponds to the distance 524 (FIGS. 5 and 6). That is, the change in position of the correlation peaks 702 and 704 can be measured to determine the distance 524. Thus, the difference between the vertical height of surfaces 302 and 306 is determined accurately and reliably.

For convenience of illustrating the operation and functionality of the OTG 400 employing the split-beam probe head 412, the reference correlation peak 702 and the correlation peak 704 are shown together on graph 700. In one embodiment, only one correlation peak 702 or 704 would be shown at a time. That is, when the split-beam probe head 412 is positioned in accordance with FIG. 5, only the correlation peaks 202 and 702 would be shown on graph 700. Then, after positioning the split-beam probe head 412 in accordance with FIG. 6, only the correlation peaks 202 and 704 would be shown on graph 700. The user of PC 404 (FIG. 4) would then determine the distance 524 based upon the change in position of the correlation peaks 702 and 704. In another embodiment, logic residing in PC 404 is configured to hold the display of correlation peak 702 such that the correlation peak 702 is concurrently displayed with the correlation peak 704. Another embodiment measures the change in position of the correlation peaks 702 and 704, and then displays alphanumeric information telling the user of PC 404 the length of distance 524.

e. Repositioning the Probe Head Between Measurements

One skilled in the art will appreciate a particularly advantageous feature of the split-beam probe head 412 when used to measure the difference between the vertical height of surfaces 302 and 306. This particularly advantageous feature is that when the split-beam probe head 412 is repositioned after taking the reference measurement (according to FIG. 5), the split-beam probe head 412 does not have to be repositioned at exactly the same distance from the surface 302 as when the measurement was taken of the surfaces 302 and 306 (according to FIG. 6). That is, the length of path 520 (FIG. 5) and the length of path 606 need not be identical.

The position of the reference measurement correlation peak 702 (FIG. 7) is determined by the optical path length difference between the walk-off beam 514 and the primary beam 512 (FIG. 5). This optical path length difference equals two times the difference between the optical path lengths 516 and 518 (FIG. 5), plus two times the difference between the optical path lengths 520 and 522 (FIG. 5). This optical path length difference is always constant, independent of the length of paths 520 and 522 (FIG. 5), as long as paths 520 and 522 change by the same amount. That is, the split-beam probe head 412 can be raised and lowered with respect to surface 302 without changing the optical path length difference between the walk-off beam 514 and the primary beam 512, as long as the angular alignment of the probe head is maintained.

Similarly, the position of the correlation peak 704 (FIG. 7) is determined by the optical path length difference between the walk-of beam 604 and the primary beam 602 (FIG. 6). This optical path length difference equals two times the difference between the optical path lengths 516 and 518 (FIG. 6), plus two times the difference between the optical path lengths 606 and 608 (FIG. 6). This optical path length difference is always constant, independent of the length of paths 606 and 608 (FIG. 6), as long as paths 606 and 608 change by the same amount. That is, the split-beam probe head 412 can be raised and lowered with respect to surfaces 302 and 306 without changing the optical path length difference between the walk-off beam 514 and the primary beam 512, as long as the angular alignment of the probe head is maintained.

Since the change in optical path length differences of both beams in comparing FIG. 5 to FIG. 6 is independent of the distance that the split-beam probe head 412 is from the surfaces 302 and/or 306, the user of the OTG 400 (FIG. 4) does not need to exactly reposition the split-beam probe head 412 so that the distance of paths 520 and 606 are exactly equal. Only the angular alignment needs to be maintained. Thus, the OTG 400 is very easy to use.

f. Other Measurements

When the position of the reference measurement correlation peak 702 is determined in accordance with FIG. 5, the surface 302 is aligned substantially orthogonal to the direction of the primary beam 512 and the walk-off beam 514. If the position of the material 304 is rotated such that distance 522 changes with respect to distance 520, a subsequent measurement made by the split-beam OTG 400 will enable a determination of the change in angular displacement of the surface 302. The optical path length differences traveled by the primary beam 512 and the walk-off beam 514 will change when the material 304 is rotated. Because the separation distance between the paths 520 and 522 is known, an angular rotation of the surface 302 will generate a corresponding change in optical path length difference between the primary beam 512 and the walk-off beam 514. Thus, one skilled in the art will appreciate the angular rotation of the surface 302 is easily calculated using well known geometric equations.

The operation of the split-beam OTG 400 was described as being employed in the measurement of the distance 524 which corresponds to the height difference between the surfaces 302 and 306. One skilled in the art will appreciate that the difference in position of any two adjacent surfaces may be determined irrespective of their spatial orientation. That is, the split-beam OTG 400 easily measures a difference in positioning of two vertical surfaces by simply rotating the position of the split-beam probe head 412 by ninety degrees such that the walk-off beam and the primary beam are incident upon the two vertical surfaces of interest. One skilled in the art will appreciate that the split-beam OTG 400 is equally suitable for measuring the difference between the positioning of any two adjacent surfaces in any spatial orientation.

The split-beam OTG 400 is capable of measuring the depth of slots, grooves, holes or other forms of surface indentations in a surface. A reference measurement is made by shining the primary beam and the walk-off beam upon one of the surfaces of interest. Then, the primary beam is shined on a first surface of interest and the walk-off beam is shined on a second surface of interest. For example, the second surface of interest could be the bottom of the slot, groove, hole or other indentation on the material. Thus, a change in position between a reference measurement correlation peak and a correlation peak associated with the measurement of the bottom surface of the slot, groove, hole or other indentation on the material determines the depth of the groove, slot, hole or other indentation.

The split-team OTG 400 is capable of measuring distances through materials that are transparent or semi-transparent. For example, material 304 (FIG. 5) may have a semi-transparent layer (not shown) disposed on the top surface 302. When a reference measurement is made with both the primary beam 512 and walk-off beam 514 of material 304, additional correlation peaks (not shown) will appear on graph 700 in addition to reference measurement correlation peak 702. These additional correlation peaks determine the thickness of the semi-transparent layer on the top of surface 302. Thus, the split-beam OTG 400 may be used to accurately align the semi-transparent layer on the top of surface 302 with the surface 306. Furthermore, any surface in material 304, such as an intermediate or embedded surface, may be measured a surface on the material 308.

One skilled in the art will appreciate that the split-beam OTG 400 is capable of measuring the positional difference between any two surfaces of interest by simply taking a reference measurement and then taking a measurement of the two surfaces of interest in a manner described hereinabove. Thus, the above-described measurements of two surfaces are merely illustrated examples of the way in which the split-beam OTG 400 may be used to take measurements of two adjacent surfaces. It is intended that all such applications of a split-beam OTG 400 be included herein within the scope of this disclosure and be protected by the accompanying claims.

g. Alternative Embodiments

One embodiment provides for the reconfiguring of the prior art OTG 100 (FIG. 1). Here, a split-beam probe head, having the same functionality and operation of the split-beam probe head 412 (FIG. 4), is configured to replace the probe head 112 (FIG. 1) of the OTG 100. Thus, a releasable coupler is provided between the optical guide 118 and probe head 112 such that probe head 112 can be removed. Then, split-beam probe head 412 is coupled to optical guide 118 such that measurements can be made of two adjacent surfaces.

Another embodiment includes a wedge-shaped plate having a reference surface residing in the split-beam probe head 412. Such a wedge-shaped plate having a reference surface is constructed substantially like the wedge-shaped plate 131 having a reference surface 130 of FIG. 1. Light reflections from the reference surface are used to generate correlation peaks associated with the primary beam and the walk-off beam generated by the split-beam probe head 412 (FIGS. 4–6). This embodiment allows the determination of distances 520 and 522 (FIG. 5), and/or the distances 606 and 608 (FIG. 6).

Another embodiment includes a means to adjust the distance of the spatial separation between the primary beam and the walk-off beam generated by the split-beam probe head. For example, the split-beam probe head may be configured to receive any one of a plurality of anisotropic crystals, each anisotropic crystal being configured to provide a different predefined spatial separation. Another embodiment may provide for the stacking of a plurality of anisotropic crystals together such that the spatial separation is easily varied. Yet another embodiment employs a system of mirrors and/or lenses to provide the desired spatial separation between the primary beam and the walk-off beam. Such embodiments are particularly advantageous when the spatial separation of the measured materials is subject to change. When the spatial separation of the materials is and/or greater than the spatial separation of the primary beam and the walk-off beam from the anistropic crystal alone.

Another embodiment includes the functionality of PC 404 (FIG. 4) as an integrated part of the split-beam OTG. That is, the split-beam OTG includes at least a processor, logic and a display screen. This embodiment is particularly advantageous in providing an integrated, stand-alone double-incident beam OTG unit. Such an embodiment could also be portable by enclosing selected components in a specially designed and fabricated housing.

Another embodiment employs a plurality of anisotropic crystals aligned such that a plurality of walk-off beams are generated. For example, with reference to FIGS. 5 and 6, a second anisotropic crystal may be placed below the exit point of the walk-off beams 514 and 604 from the anisotropic crystal 504 such that the walk-off beam is split into a second primary beam and a second walk-off beam by the second anisotropic crystal. Thus, three incident beams are formed such that measurements from three surfaces may be made. Alternatively, the second anisotropic crystal could be placed under exit point of the primary beam 512 or 602 from the anisotropic crystal 504 such that the primary beam is split into a second primary beam and a second walk-off beam by the second anisotropic crystal. Furthermore, additional anisotropic crystals can be employed to generate as many incident beams as desired by cascading anisotropic crystals in series. One skilled in the art will appreciate that any plurality of incident beams may thus be configured by cascading a plurality of anisotropic crystals. The spatial separation between the plurality of incident beams thus generated is easily configured by selecting anisotropic crystals having desirable dimensions and having crystal properties that split incoming beam into a primary beam and a walk-off beam having a desired angular separation.

For convenience of describing the functionality and operation of the split-beam OTG, the split-beam OTG 400 was described as employing low-coherence light generated by the low-coherence light source 406. Alternative embodiments employ other transmittable, low-coherence energy spectrums. Waves associated with the selected spectrum are split into a primary wave and a walk-off wave, and then projected upon the surfaces being measured. The reflected waves are then correlated such that a change in the position of the determined correlation peaks correspond to the difference in the height of the two measured adjacent surfaces. For example, a wave residing in the infra red portion of the energy spectrum could be selected.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Now, therefore, the following is claimed:

1. A system for measuring heights of two adjacent surfaces comprising:

a wave generator configured to generate a low-coherence wave;

a probe head coupled to the wave generator, the probe head configured to split the received low-coherence wave from the wave generator into a primary beam and a walk-off beam, and further configured to transmit the primary beam onto a first surface and configured to transmit the walk-off beam onto a second surface adjacent to the first surface; and a correlator coupled to the probe head, the correlator configured to detect a reflected portion of the primary beam reflected from the first surface, and configured to detect a reflected walk-off beam reflected from the second surface, and the correlator further configured to determine a distance difference between the first surface and the second surface.

2. The system of claim 1, wherein the wave generator further comprises a low-coherence light source that generates the low-coherence wave characterized as a low-coherence light.

3. The system of claim 1, further comprising a crystal residing in the probe head and configured to split the low-coherence wave into the primary beam and the walk-off beam.

4. The system of claim 1, further comprising a crystal residing in the probe head and configured to split the low-coherence wave into the primary beam and the walk-off beam and configured to separate the primary beam and the walk-off beam by a predetermined distance such that the primary beam is substantially incident on the first surface and the walk-off beam is substantially incident on the second surface.

5. The system of claim 1, further comprising a polarizer configured to polarize the reflected primary and reflected walk-off beams into a single direction so that the reflected primary and reflected walk-off beams exhibit a desired interference.

6. The system of claim 1, further comprising a processor configured to compute the distance difference between the first surface and the second surface based upon a correlated time delay between the reflected portion of the walk-off beam and the reflected portion of the primary beam.

7. The system of claim 1, further comprising a polarizer that generates a polarized light beam from the low-coherence wave received from the wave generator such that the polarized light beam is split into the primary beam and the walk-off beam.

8. The system of claim 7, wherein the polarizer is further configured to polarize the reflected primary and reflected walk-off beams into a single direction so that the reflected primary and reflected walk-off beams exhibit a desired interference.

9. The system of claim 7, wherein the polarizer resides in the probe head.

10. A method for measuring heights of two adjacent surfaces comprising, the method comprising the steps of:
receiving a low-coherence light beam;
splitting the low-coherence light beam into a primary beam and a walk-off beam;
transmitting the primary beam onto a first surface and the walk-off beam onto a second surface;
detecting reflections of the primary beam from the first surface and the walk-off beam from the second surface; and
determining a distance between the first surface and the second surface based upon a change in a path distance of the detected reflections of the primary beam and the walk-off beam.

11. The method of claim 10, further comprising the step of generating the low-coherence light beam.

12. The method of claim 10, further comprising the step of correlating the detected reflections of the primary beam and the walk-off beam to determine a correlation peak.

13. The method of claim 10, further comprising the step of transmitting the primary beam and the walk-off beam onto the first surface to determine a reference path difference.

14. The method of claim 13, further comprising the step of comparing the reference path difference with the change in the path difference.

15. The method of claim 13, further comprising the steps of:
determining a reference correlation peak based upon the reference path difference;
determining a correlation peak based upon the path difference; and
comparing the difference in position of the reference correlation peak and the correlation peak to determine the distance.

16. The method of claim 10, further comprising the step of polarizing the reflections of the primary beam and the walk-off beam.

17. The method of claim 10, further comprising the step of polarizing the received low-coherence light beam.

18. A system for measuring heights of two adjacent surfaces comprising:
means for receiving a low-coherence light beam;
means for splitting the low-coherence light beam into a primary beam and a walk-off beam;
means for transmitting the primary beam onto a first surface and the walk-off beam onto a second surface;
means for detecting reflection of the primary beam from the first surface and the walk-off beam from the second surface; and
means for determining a distance between the first surface and the second surface based upon a change in a path distance of the detected reflections of the primary beam and the walk-off beam.

19. The system of claim 18, further comprising means for generating the low-coherence light beam having a pre-defined range of frequencies.

20. The system of claim 18, further comprising means for generating the low-coherence light beam.

21. The system of claim 18, further comprising means for correlating the detected reflections of the primary beam and the walk-off beam to determine a correlation peak.

22. The system of claim 21, further comprising means for determining a reference correlation peak based upon a reference path difference, the reference path difference measured when the primary beam and the walk-off beam are transmitted onto the first surface, such that the distance is determined by comparing the difference in position of the reference correlation peak and the correlation peak.

23. A system for measuring heights of two adjacent surfaces comprising:
wave generator configured to generate a low-coherence wave;
a probe head coupled to the wave generator, the probe head configured to receive the low-coherence wave from the wave generator, to transmit a primary beam onto a first surface and receive a reflected primary beam from the first surface, and to transmit a walk-off beam onto a second surface adjacent to the first surface and receive a reflected walk-off beam from the second surface;
a polarizer residing in the probe head that polarizes the received low-coherence wave into a polarized light beam, and further polarizes the reflected primary beam and reflected walk-off beam into a single direction so that the reflected primary and reflected walk-off beams exhibit a desired interference;
a crystal residing in the probe head configured to receive the polarized light beam and configured to split the polarized light beam into the primary beam and the walk-off beam; and
a correlator coupled to the probe head, the correlator configured to detect at least a portion of the reflected primary beam and at least a portion of the reflected walk-off beam, and to determine a distance difference between the first surface and the second surface.

* * * * *